United States Patent [19]

Frydryk

[11] 4,044,501
[45] Aug. 30, 1977

[54] SEED BED COVER WITH IMPROVED, REINFORCED EDGE SECTIONS

[75] Inventor: John Frydryk, Springfield, Mass.

[73] Assignee: Johnson & Johnson, New Brunswick, N.J.

[21] Appl. No.: 734,917

[22] Filed: Oct. 22, 1976

Related U.S. Application Data

[63] Continuation of Ser. No. 637,904, Dec. 5, 1975, abandoned.

[51] Int. Cl.² .......................... B32B 3/04; B32B 7/14
[52] U.S. Cl. .................................... 47/26; 428/121; 428/126; 428/130; 428/195; 428/245; 428/194; 428/289
[58] Field of Search ............... 428/102, 121, 126, 130, 428/131, 134, 135, 136, 195, 245, 289, 194; 47/9, 28 R, 31, 56, 26

[56] References Cited

U.S. PATENT DOCUMENTS 3,767,747  11/1973  Chapman, Jr. .......................... 47/9

Primary Examiner—Marion E. McCamish
Assistant Examiner—P. J. Thibodeau

[57] ABSTRACT

An improved, reinforced edge section for use on seed bed cover fabrics. The improved edge section is formed of multiple layers of the fabric along the side of the fabric. A plurality of openings is included through the multiple layer. To strengthen the edge section and prevent tearing, flexible reinforcing bands are located on the edge section securing the layers together. At least one band lies between each of the openings and the inside border of the layers, and at least one band lies between each of the openings and the outside border of the layers.

10 Claims, 5 Drawing Figures

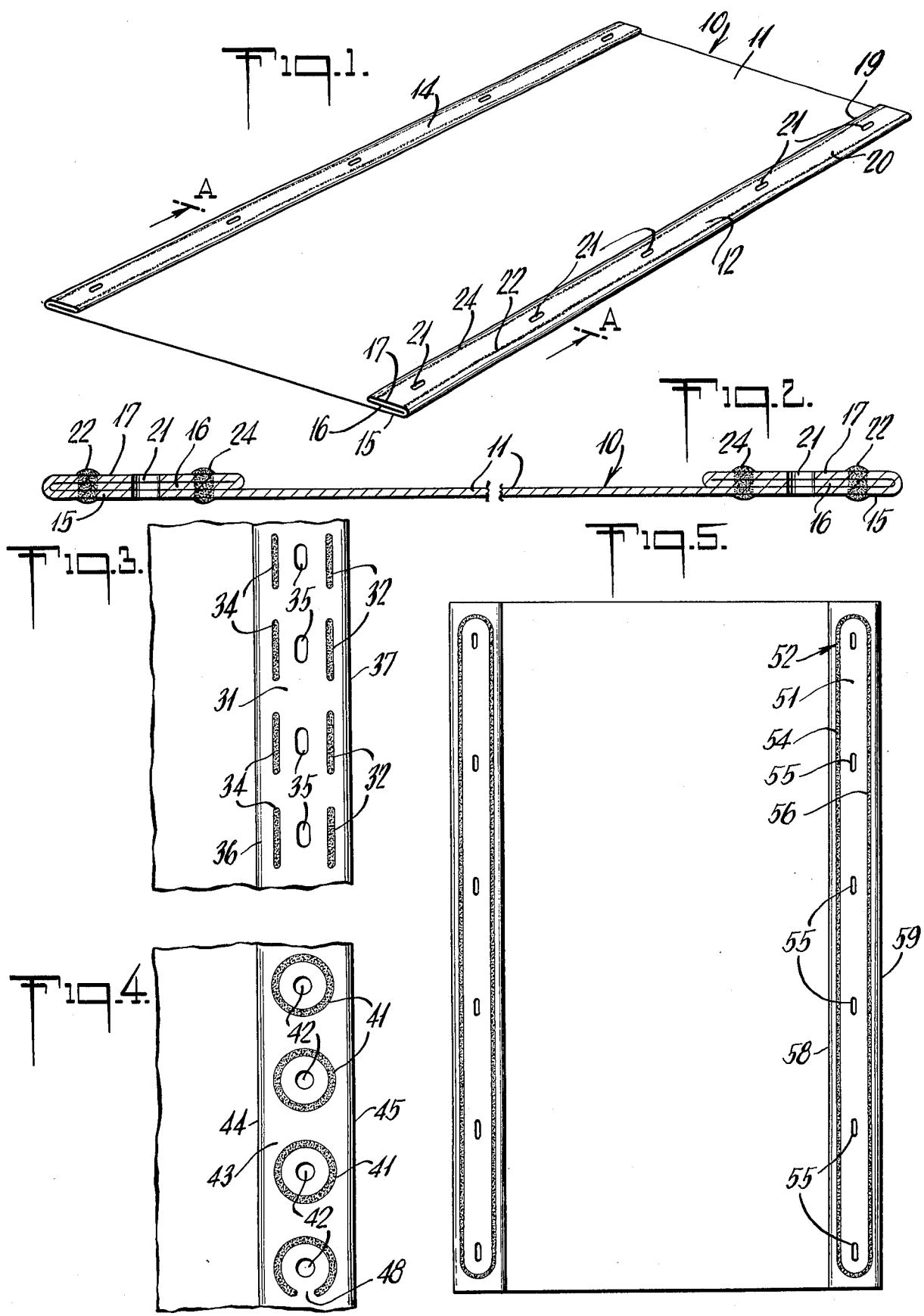

4,044,501

SEED BED COVER WITH IMPROVED, REINFORCED EDGE SECTIONS

This is a continuation of application Ser. No. 637,904 filed Dec. 5, 1975 and now abandoned.

BACKGROUND OF THE INVENTION

This invention relates generally to improvements in the reinforcement of edge sections of fabrics and more particularly concerns improved, reinforced edge sections of porous nonwoven fabrics used as seed bed covers.

Spunbonded fabrics have been found to be very beneficial and useful to farmers, horticulturists and the like. The flat, porous nature of spunbonded fabrics, along with good flexibility characteristics, has made these fabrics very practical as seed or plant bed covers to protect plants and crops during the initial stages after planting, and to foster their growth in the early periods of development. As a protective cover, the spunbonded fabrics provide temperature control for the seed beds to minimize the effects of unseasonal frosts or excessively high temperatures, lessen the effects of erosion and wash-out due to the elements, and keep away foraging birds and animals; as a porous, open blanket, however, spunbonded fabrics allow rain water, spray materials such as pesticides, fungicides, etc., to penetrate through without removal of the cover, among other advantages.

While the advantages of using a spunbonded fabric as a seed bed cover is attractive to farmers, some problems have arisen in using this or similar types of fabric in the field which indicate that there is room for improvement in this type of product. A number of problems stem from the nature of the spunbonded fabric itself. Spunbonded fabrics are basically flat, planar, lightweight, fabricated materials having randomly formed porous nonwoven structures. These fabrics are commonly made by deposition of continuous filaments in freshly spun condition on a moving conveyor, and are deposited so as to lie in a very intermingled, random arrangement among each other. When deposited, the filaments may inherently stick to each other, be heated or chemically treated so that the filaments will bond to each other at the points of intersection, overlap or cross. Well-known techniques for producing spunbonded fabrics are described in U.S. Pat. Nos. 3,595,731 and 3,368,934.

When these fabrics are used in the field to cover a seed or plant bed, generally only one layer of the fabric provides the coverage. The thickness of the fabric commonly is no more than two or three times the denier of the filaments, or in the neighborhood of 0.005 inch. (0.0127 cm.). While this thickness provides for the many desirable qualities of the seed bed cover, it presents a problem in the manner in which the cover is held down over the seed bed.

Typical spunbonded seed bed covers are produced in lengths up to 100 yards (91.4 m.) and in widths of between 3 and 5 yards (2.74–4.57 m.). The farmer rolls the cover out over the seed bed and fastens the cover to the ground along the sides of the cover at spaced intervals for the entire length of the fabric. As a fastening device, the farmer uses hooks, stakes or pins to protrude through the edges of the spunbonded fabric into the ground. Due to the thin, flat nature of the spunbonded material, the fastening devices used by farmers tend to tear the edges of the fabric initially or after the fabric has been laid down and is exposed to windy conditions.

One manner of reinforcing the sides and ends of flat, lightweight, porous, nonwoven fabrics such as spunbonded fabrics has been described in U.S. Pat. No. 3,769,747. In that patent, the edge portions of the spunbonded fabric are folded over a narrow strip of thermoplastic material which is parallel to the edge of the fabric. The strip is sandwiched between two layers of the spunbonded structure. To close the sandwiched layer, heat may be applied to bond the three layers together or an ultrasonic sewing machine may be used to seal the layers. While the construction of the edge portions of this patent has provided one means for a farmer to affix the cover to the ground, some deficiencies have been noted in the edge portions described therein. For example, the reinforcing strip between the layers on the edge segments has made packaging, folding, handling and transporting of the fabric difficult. To provide sufficient strength of reinforcement at the edges, flexibility, and suppleness have been sacrificed. Also, when the edge layers are sewn together around the strip, the stitching near the inside portion of the strip tends to induce stitch-tear stresses which allow the fabric to tear more readily. When high winds occur, the fabric will tear along the inside stitches, leaving the edge portion affixed to the ground, while the main body of the fabric is free to be flapped over by the wind.

SUMMARY OF THE INVENTION

A flat, lightweight, porous, nonwoven fabric for use as a seed bed cover having improved, reinforced edge sections has been developed. The novel edge sections of the present invention on such a fabric, such as a spunbonded fabric, provide an improved means of fastening the fabric to the ground while minimizing the possibility of tearing due to heavy wind conditions or surface forces due to streams of water which follow rain storms.

Stitch-tear stresses inherent in the edge sections of spunbonded fabrics known in the art are greatly reduced due to the construction of the edges and the reinforcing means of the present concept.

The improved edge sections of this invention also have the advantages of ease of folding and packaging over the prior art; since there is no sandwiched strip involved in this new edge section, the weight of the overall fabric is reduced and the fabric can be packaged or boxed in smaller containers. Not only is the elimination of the sandwiched strip a cost savings in itself, but a packaged product of smaller size and weight also costs less to ship.

In accordance with the present invention, improved reinforced edge sections of a flat, lightweight, porous nonwoven fabric for use as a seed bed cover have been discovered. Comprising the improved, reinforced edge section are multiple layers of the fabric in superimposed relationship on a side of the fabric. There is a plurality of openings at spaced intervals through the layers of the edge section. Each edge section has at least two flexible reinforcing bands securing the layers of the edge section together. The reinforcing bands are positioned so that at least one band lies between each of the openings and the inside border of the edge section and at least one band lies between each of the openings and the outside border of the edge section.

A preferred embodiment of the improved reinforced edge section on a spunbonded fabric has three layers of fabric superimposed on each other along one side of the fabric. A row of openings has been placed through the layers of the edge section. Two continuous flexible reinforcing bands extend along the length of the edge and fasten the layers together. These reinforcing bands are formed of a hot melt adhesive binder, and are positioned on the layers of the edge section so that one continuous band lies between the row of openings and the inside border of the edge section, and the other continuous band lies between the row of openings and the outside border of the edge section.

In use, the reinforcing bands astride each opening prevent the openings from tearing inward towards the fabric and from tearing outward away from the fabric. Having at least two reinforcing bands associated with the layers of each edge section increases the strength of the edge section since the layers are fastened together in more than one place.

BRIEF DESCRIPTION OF THE DRAWINGS

These and other advantages, features and aspects of the invention will become more apparent upon reading the following detailed description and upon reference to the drawings, wherein:

FIG. 1 is a perspective view showing a fabric having use as a seed bed cover with the improved, reinforced edge sections;

FIG. 2 is a cross-sectional view of the fabric taken along line A—A of FIG. 1;

FIGS. 3 and 4 are partial plan views of the seed bed cover showing other embodiments of the improved edge section; and FIG. 5 is a plan view in which each edge section includes only one, continuous reinforcing band.

DETAILED DESCRIPTION OF THE DRAWINGS

Turning first to FIGS. 1 and 2, a seed bed cover 10 is shown in the preferred embodiment of the invention. Comprising the seed bed cover 10 is a spunbonded fabric 11 which encompasses the main or body portion of the cover. On each side of the fabric 11 is an edge section 12 and 14. Each edge section is formed of multiple layers of the spunbonded fabric. In the embodiment described, the edge sections 12 and 13 are folded over twice so that a three-layered structure is formed. Layers 15, 16 and 17 of the edge section are folded so that the layers are superimposed on each other thereby forming a triple-thick edge section at the side of fabric 11. While three layers are preferred, only two layers are required to add strength to the edge section, but as many layers as practical may be employed. Folded layers are also not essential in the edge sections to provide strength, i.e., the edge section 12 may be formed of separate strips of fabric 15, 16 and 17 rather than folded edges of the main fabric 11. However formed, the layers of the edge section have an inside border 19 facing inward towards the fabric 11 and an outside border 20 facing outward away from the fabric 11.

A plurality of openings or holes 21 are included through the layers of the edge section. The openings 21 are at spaced intervals through the layer and are intended to be employed to hold or fasten the seed bed cover to the ground during use.

To reinforce the edge section, reinforcing bands 22 and 24 are provided. At least two flexible reinforcing bands are required with each edge section. These reinforcing bands 22 and 24 secure the layers 15, 16 and 17 together in order to provide a strong, triple-thick edge section. In order to prevent tearing of the openings 21 either inwardly or outwardly, the bands 22 and 24 are positioned astride of the openings 21. In the embodiment shown, one continuous band 22 lies between each of the openings 21 and the inside border 19 of the layers of the edge section, while another continuous band 24 lies between each of the openings 21 and the outside border 20 of the layers of the edge section. The critical location of the reinforcing bands 22 and 24 keeps the openings 21 from tearing outward in which case the entire fabric would be free to blow or flap in the wind; it also prevents the openings 21 from tearing inward to where the fabric is only one layer thick and would easily be torn and placed at the mercy of the wind. For best protection against tearing, it is preferable to have each of the bands 22 and 24 extending in a continuous path along the length of the edge section as depicted in FIG. 1.

Although the improved, reinforced edge sections may find beneficial use with many types of lightweight, flat, porous nonwoven fabrics, spunbonded fabrics used as seed bed covers are especially suited for utilization of the improved edge sections. Spunbonded fabrics are essentially flat, lightweight fabricated materials having randomly-formed porous nonwoven structures. The structure of this fabric is comprised of continuous, intermingled thermoplastic filaments bonded to each other at a multiplicity of irregularly spaced intersecting and overlapping points along their lengths. As a result of the fabrication of spunbonded fabrics, they are very open and porous while being very flexible.

The materials out of which spunbonded fabrics are fabricated include a wide range of synthetic organic thermoplastic filaments such as nylon polyamides, polyesters, polyolefins, polyacrylics, polyurethanes, polycarbonates, polyacetals, and the like, and also blends and mixtures of the various types of filaments.

As a flat, lightweight product, the filaments of the spunbonded fabric have a denier generally in the range of between 1 and 10 denier. With this range of deniers, the fabric is formed to have a lightweight construction in which the weight of the fabric generally lies between 0.3 ounces per square yard (11.1 g./sq. m.) and 6 ounces per square yard (220 g./sq. m.).

The edge sections provided along the sides of the seed bed cover may be any suitable width which is compatible with use of the cover in the field. Although not limited thereto, typical widths of the edge sections of the fabric range from about ½ inch (1.27 cm.) to 3 or 4 inches (7.62 or 10.2 cm.). As long as multiple layers of fabric are provided as the edge sections in a superimposed relationship, depending upon the strength of the edges desired, availability, of materials, convenience of fabrication and other variables, the edge sections may take a variety of shapes. For instance, the layers may be folded, once, twice or as many times as is desired within feasible limits; the folds may all be inward (such as a C-shape) or may be folded alternately inward and outward (such as a Z-shape). Another instance of constructing the edge sections includes the stacking of separate strips of fabric at the side into the superimposed layered section which is desired. Other techniques and forms of providing a layered edge section may also be used within the scope of this invention.

In each edge section and through the layers of fabric a plurality of openings is formed. These openings may be circular holes, oblong slits or any other shape which may be desired. To form the openings in the layers, punching means may be utilized as well as a heated die which melts through the thermoplastic filaments to cause an opening. The advantage of using a heated die is that often the inside edges of the opening being formed stick to the edges of adjacent layers due to the molten condition of the fabric at those points. The joined edges of the openings of the layers add extra strength to the openings which provides a self-grommeting effect. With this feature of the openings it is not necessary to use additional grommets which have been used in prior art products.

The openings are placed in the edge sections at spaced intervals, preferably in a substantially straight row. While any suitable spacing of the openings may be practiced, it is preferable to space the openings equidistantly in the edge section, generally located from about 4 inches (10.2 cm.) to 36 inches (91.8 cm.) apart.

It is the purpose of the openings in the edge sections to provide means for the cover to be fastened to the ground over the seed bed. Hooks, pins, clamps, and other fastening devices are inserted through the openings and into the ground to maintain the cover in position in the field. Quite often the openings of adjacent seed cover covers are aligned so that adjacent sides of the covers can be secured to the ground coincidently.

To secure the layers of the edge section together while providing strength to the edge section at least two reinforcing bands are included on each edge section. Actually, the reinforcing bands are not only on the layers of the fabric at the edges, but penetrate and extend through the layers in order to fasten all the layers at the edges into a joined structure where the bands are located. This feature is clearly shown in FIG. 2 wherein the reinforcing bands 22 and 24 are evident on the surfaces of the outside layers 15 and 17, and also extend through the layers 15, 16 and 17 to join all the layers together where the bands lie.

The reinforcing bands are essentially strips of material which are capable of binding the layers of the edge section together to produce a stronger edge section. Adhesive binders such as glues, plastic, and hot-melt compositions are preferably employed as reinforcing bands due to their ease of application, penetration and strength properties, compatibility with the thermoplastic filaments of spunbonded fabrics, and flexibility characteristics. Other reinforcing bands such as threads of stitching, while less preferable than adhesive binders, may also be used with satisfactory results depending upon the contemplated conditions in the field.

While the preferable configuration of the reinforcing bands has been explained in conjunction with FIGS. 1 and 2, other embodiments and techniques of locating the reinforcing bands may be utilized in conformity with the requirements of the invention. For instance, as seen in FIG. 3, the edge section 31 has the reinforcing bands 32 and 34 in intermittent lines along the length of the edge section. This embodiment is a modification of the configuration of the reinforcing bands of FIG. 1; instead of two continuous reinforcing bands, there is one intermittent line of bands 32 between the spaced apart openings 35 and the inside border 36 of the edge section 31, and another intermittent line of bands 34 between the spaced apart openings 35 and the outside border 37 of the edge section 31. Of course, the intermittent line of bands must be located so that at least one band lies between the openings and the respective borders of the edge section, such as a pair of bands 32 and 34 astride each opening 35 in FIG. 3. When an intermittent configuration of bands is used, however, it is not necessary to have a pair of reinforcing bands astride each opening, since more than one opening can be associated with each pair of reinforcing bands.

Rather than have a continuous or intermittent line of reinforcing bands along the length of the edge section, the reinforcing bands 41 may substantially encircle the openings 42 as seen in the edge section 43 in FIG. 4. By substantially encircling is meant that the reinforcing bands 41 may completely surround an opening 42, or may encircle an opening so that the band lies between the opening 42 and the inside and outside borders 44 and 45, but leaves a gap 48 or a somewhat open circle. Furthermore, if desired, more than one opening may be substantially encircled by a reinforcing band.

While the preferred embodiment includes two continuous reinforcing bands as described in conjunction with FIG. 1, the preferred embodiment may be modified slightly so that instead of two separate, continuous reinforcing bands on each edge section, there is one, totally encompassing band surrounding all the openings. As seen in FIG. 5, the edge section 51 has only one reinforcing band 52 located thereon. Although the reinforcing band 52 is one continuous band, it is positioned so that a portion 54 of the band 52 lies between all of the openings 55 and the inside border 58 of the layers and another portion 56 of the band 52 lies between all of the openings 55 and the outside border 59 of the layers.

One instance of the invention will be described in greater detail in the following specific example, given primarily for the purposes of illustration.

EXAMPLE

A spunbonded fabric for use as a seed bed cover is fabricated from polyhexamethylene adipamide nylon 6/6 continuous filaments. The continuous filaments average 4 denier, the weight of the cover is about 0.6 ounces per square yard (22.2 g./sq.m), and the thickness of the cover is about 0.005 inch (0.0127 cm.). The sides of the fabric are folded twice in a superimposed relationship so that the edge sections have a Z-shaped configuration in a triple-thick layered construction. Each edge section is approximately 1-¾ inches (4.45 cm.) in width. A row of slits is formed in the edge sections by a heated die so that the inside edges of the slits are joined at adjacent layers. The slits are spaced apart approximately 30 inches (76.2 cm.). Two flexible, continuous reinforcing bands are located on and secure the layers of each edge section. The reinforcing bands are formed from a hot melt adhesive binder. One continuous reinforcing band of hot melt material is positioned between the row of slits and the inside border of the edge section, the other reinforcing band between the row of slits and the outside border of the edge section. The improved edge sections allows compact packaging of the seed bed cover before and during shipping, easy handling and flexibility in the field, and secure fastening of the cover to the ground with increased strength to reduce tearing during use in the field.

Thus, it is apparent that there has been provided, in accordance with the invention, an improved, reinforced edge section on seed bed covers that fully satisfies the aims, advantages and aspects set forth above. While the invention has been described in conjunction with specific embodiments thereof, it is evident that many alternatives, modifications and variations will be apparent to those skilled in the art in view of the foregoing description. Accordingly, the plenary invention is intended to embrace all such alternatives, modifications, and variations as fall within the spirit and broad scope of the described invention.

What is claimed is:

1. A flat, lightweight, porous, nonwoven fabric for use as a seed bed cover having improved, reinforced edge sections, each of said edge sections consisting of: multiple layers of said fabric in superimposed relationship on a side of said fabric, the layers of the edge section having an inside border facing the fabric and an outside border facing away from the fabric; a plurality of openings at spaced intervals through said multiple layers; and two flexible reinforcing bands on said edge section securing said layers together, each band extending in a continuous path along the length of the edge section, one band positioned between the openings and the inside border of the layers, the other band positioned between the openings and the outside border of the layers.

2. A fabric as defined in claim 1, wherein the reinforcing bands are adhesive binder materials.

3. A fabric as defined in claim 2 wherein the adhesive binder material is an adhesive hot melt material.

4. A fabric as defined in claim 1, wherein there are at least three layers of said fabric forming an edge section on a side of the fabric.

5. A fabric as defined in claim 1, wherein the band positioned between the openings and the inside border of the layers is a first intermittent line of reinforcing bands, and the band positioned between the openings and the outside border of the layers is a second intermittent line of reinforcing bands.

6. A fabric as defined in claim 1, wherein a plurality of openings is substantially encircled by a reinforcing band.

7. A fabric as defined in claim 1, wherein the two reinforcing bands of each edge section are provided by one continuous band positioned so that a portion of the band lies between all of the openings and the inside border of the layers and another portion of the band lies between all of the openings and the outside border of the layers.

8. A fabric as defined in claim 1, wherein the fabric is a spunbonded fabric.

9. A fabric as defined in claim 8, wherein there are two reinforcing bands of adhesive hot melt material, each band extending in a continuous path along the length of the edge section, one band positioned between the openings and the inside border of the layers, the other band positioned between the openings and the outside border of the layers.

10. A fabric as defined in claim 1 wherein the inside edges of said openings are adhered to the edges of the openings of adjacent layers of the fabric thereby providing a self-grommeting effect.

* * * * *